United States Patent [19]

Mladenovic

[11] Patent Number: 5,783,853
[45] Date of Patent: Jul. 21, 1998

[54] SENSOR HAVING AN OFFSET VOLTAGE AND METHOD OF OPERATION

[75] Inventor: Dragan Mladenovic, Scottsdale, Ariz.

[73] Assignee: Motorola, Inc., Schaumburg, Ill.

[21] Appl. No.: 581,977

[22] Filed: Jan. 2, 1996

[51] Int. Cl.$^6$ ................................................ H01L 29/84
[52] U.S. Cl. ................................ 257/415; 73/727
[58] Field of Search ........................ 257/415, 417, 257/419; 438/50, 53; 73/727

[56] References Cited

U.S. PATENT DOCUMENTS

| | | | |
|---|---|---|---|
| 5,086,777 | 2/1992 | Hishii | 128/675 |
| 5,224,059 | 6/1993 | Nitta et al. | 364/558 |
| 5,622,901 | 4/1997 | Fukada | 438/50 |

FOREIGN PATENT DOCUMENTS

| | | | |
|---|---|---|---|
| 62-133751 | 6/1987 | Japan | 257/536 |
| 1-302867 | 12/1989 | Japan | 257/415 |
| 2-34971 | 2/1990 | Japan | 257/415 |

Primary Examiner—Jerome Jackson
Assistant Examiner—John Guay
Attorney, Agent, or Firm—Kenneth M. Seddon; Daniel R. Collopy

[57] ABSTRACT

A diaphragm (30) flexes in response to varying forces applied to the diaphragm (30). This motion is monitored by a transducer (31) that is preferably in a Wheatstone bridge configuration. When the diaphragm (30) is in a relaxed condition, with little or no force applied to the diaphragm, an offset voltage is generated by highly doped contact regions (35,36,37,38). At least one of these highly doped contact regions (35,36,37,38) is configured to have more squares of material which increases the resistance of that particular highly doped contact region (37).

25 Claims, 2 Drawing Sheets

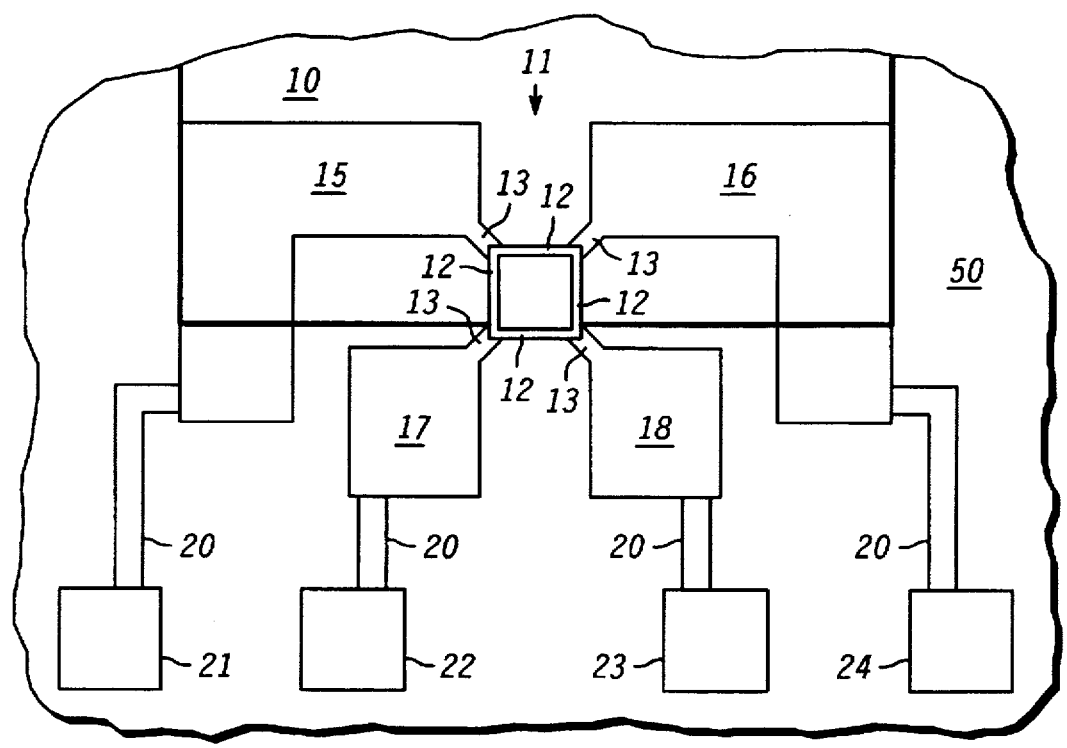
*- PRIOR ART -*
FIG. 1
FIG. 2
*- PRIOR ART -*
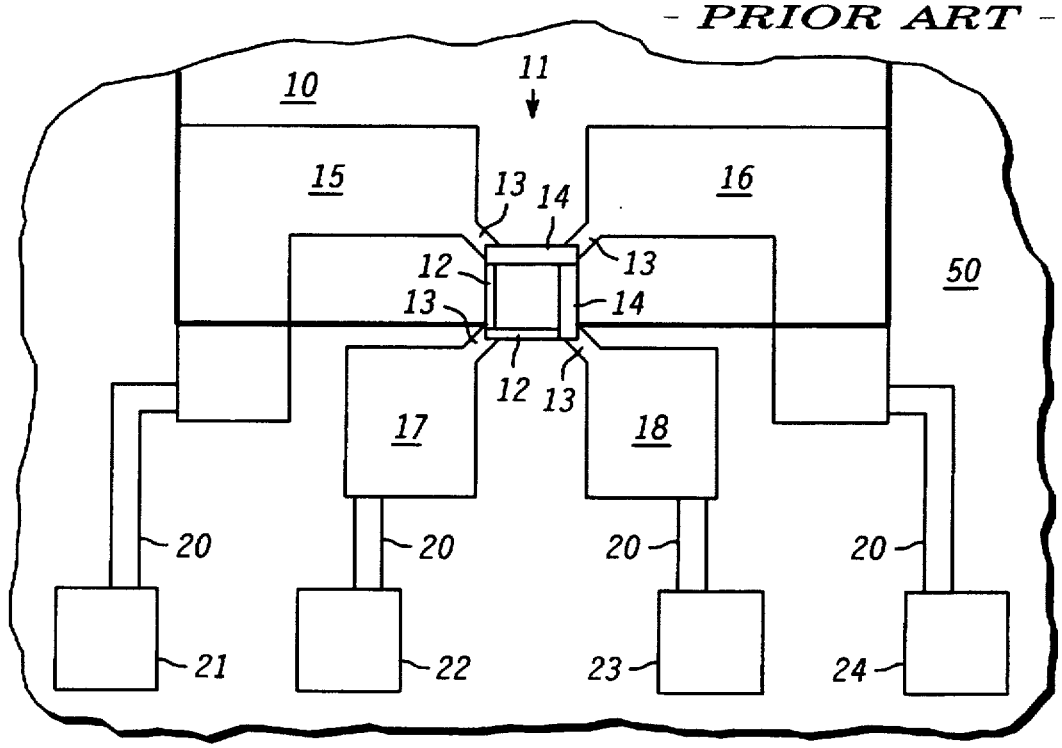

SENSOR HAVING AN OFFSET VOLTAGE AND METHOD OF OPERATION

BACKGROUND OF THE INVENTION

This invention relates, in general, to semiconductor devices, and more particularly, to sensors and methods of operation.

Semiconductor devices, such as piezoresistive pressure sensors, can utilize a thin semiconductor layer as a sensing diaphragm to detect a pressure differential across the diaphragm. To determine the approximate value of the pressure differential, a transducer comprising a Wheatstone bridge is used to measure the strain in the diaphragm. The Wheatstone bridge is made of piezoresistors whose resistance varies with the deflection of the diaphragm. As the diaphragm flexes with changing pressure, the transducer generates a voltage potential between two output pads. Traditionally, when there is no pressure differential across the diaphragm, there is no voltage potential present between the two output pads.

Some prior applications require that either a positive or negative voltage potential be present across the output pads when there is no pressure differential across the diaphragm. To generate this offset voltage, the previously known transducer structures have relied on adjusting or skewing the configuration of the Wheatstone bridge so that each electrical path has a net difference in resistance value. In doing this, these methods adjust the relative length or width of each leg in the network and move the placement of contact points across the Wheatstone bridge. Although this is a minor structural modification, it involves changes not only in the manufacturing process of the sensor, but changes in the performance and characteristics of the sensor as well.

For example, to change the relative location of the piezoresistors in the Wheatstone bridge requires that two of the photolithographic masks be changed. The first mask moves the location and size of the piezoresistors and the second mask adjusts the location of the contact regions to the Wheatstone bridge since the location of the piezoresistors has changed. From a manufacturing standpoint, the changing of two photolithographic masks to meet the requirements of a single customer's request is expensive. Since a particular offset voltage requires a change in masks at two separate process steps, it is not possible to have a manufacturing flow that allows material to be staged at a convenient point in the process flow. The change in two masking layers also hinders the throughput of the process flow and limits the flexibility of a manufacturer to varying customer demands. All of these limitations ultimately increase the final manufacturing cost of the sensor product.

In addition to complicating the manufacturing flow, skewing the shape of the Wheatstone bridge also affects the performance of the sensor component. The accuracy, temperature coefficient of offset (TCO), linearity, and impedance of the sensor are all strong functions of the configuration of the Wheatstone bridge. Any skewing that is done to the configuration will generate an offset voltage across the output pads, but it is accomplished at the cost of reducing the linearity and accuracy of the sensor. Again from a manufacturing standpoint, as customers request various offset voltages, each configuration of the Wheatstone bridge must first be tested to determine the impact it will have on the performance of the sensor. This puts the manufacturer in a difficult position in that it must not only produce a sensor that has the particular offset voltage required by the customer, but it still must meet the customer's requirements for accuracy, TCO, and linearity.

By now it should be appreciated that it would be advantageous to provide a method for adjusting an offset voltage of a sensor without requiring the modification of two photolithographic masks. It would even be more advantageous if the method could adjust the offset voltage without having any significant impact on the linearity or accuracy of the sensor.

BRIEF DESCRIPTION OF THE DRAWINGS

FIG. 1 is an enlarged top view of a previously known sensor;

FIG. 2 is an enlarged top view of a previously known sensor in an alternate skewed configuration;

DETAILED DESCRIPTION OF THE DRAWINGS

Figure 3:
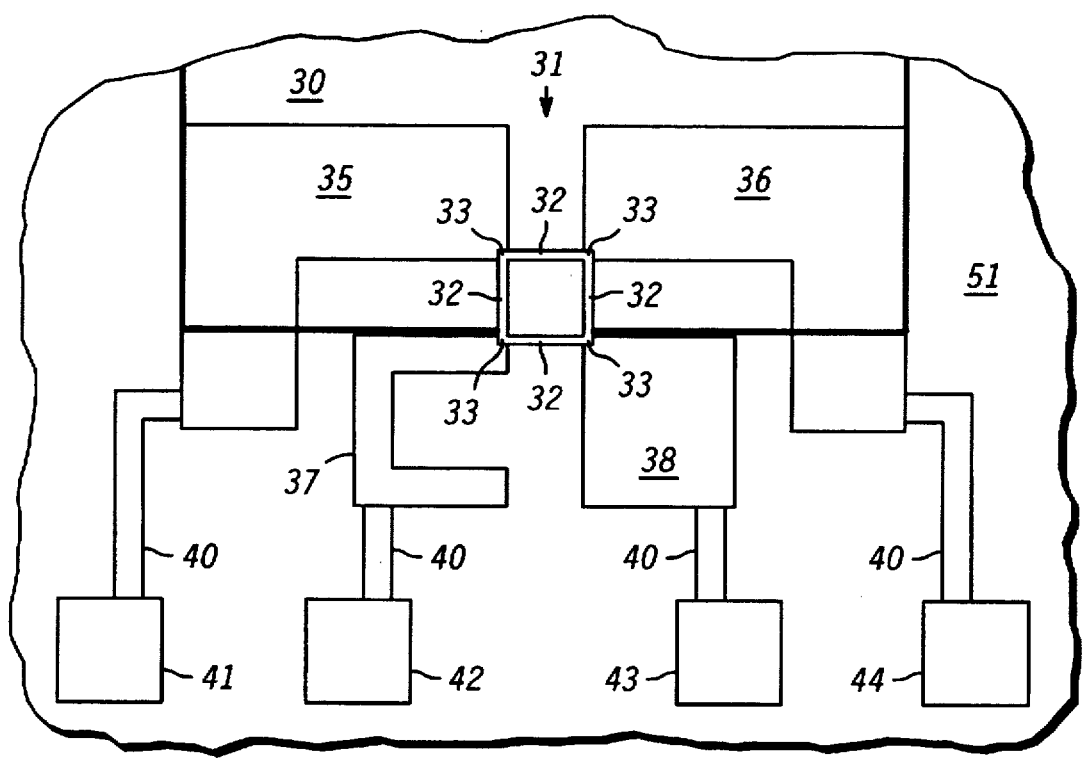
FIG. 3 is an enlarged top view of a sensor according to the present invention.

Turning to the figures for a more detailed description of the present invention, FIG. 1 is an enlarged top view of a portion of a previously known sensor 50. Sensor 50 comprises a diaphragm 10 that moves in response to changes in a pressure differential across diaphragm 10. This response is measured by a transducer 11, which is made up of piezoresistors 12 arranged as a Wheatstone bridge. Electrical contact is made to transducer 11 at contact points 13 by highly doped contact regions 15, 16, 17, and 18. These highly doped contact regions 15–18 are used to apply a voltage potential across two contact points 13 of transducer 11 and are used to measure the voltage potential present at the other two contact points 13. Each of these voltage potentials is either provided by or measured by external electrical contact using metal lines 20 and reference pads or output pads 21, 22, 23, and 24.

For example if a 5 volt voltage potential is placed across output pads 21 and 23, there will be a 5 volt voltage potential across transducer 11 at contact points 13 made by highly doped contact regions 15 and 18. As diaphragm 10 flexes, the resulting strain will change the resistance values of piezoresistors 12 which will result in a difference in voltage potential between highly doped contact regions 17 and 16. This voltage differential can be measured at output pads 22 and 24 and be used to calculate the relative pressure differential across diaphragm 10. If diaphragm 10 is in a relaxed condition and there is no pressure differential across diaphragm 10, there will be no force applied to transducer 11. This traditionally means that there is no voltage differential between output pads 22 and 24.

Some customer applications, however, are more efficient if transducer 11 can produce a voltage differential, referred to as an offset voltage, when diaphragm 10 is in a relaxed state. In order to generate an offset voltage when diaphragm 10 is in a relaxed condition, some previously known sensors skew the configuration of transducer 11 as shown in FIG. 2. FIG. 2 is an enlarged top view of previously known sensor 50 where transducer 11 is formed by skewing the configuration of piezoresistors 12 and 14. As shown in FIG. 2, transducer 11 is made from piezoresistors having two different widths (i.e. piezoresistors 12 are thinner than piezoresistors 14.) As a result, piezoresistors 12 will have a higher resistance value and produce a lower voltage potential at contact point 13 made with highly doped contact region 17. Therefore, when diaphragm 10 is in a relaxed condition, there will be a natural offset voltage potential between output pads 22 and 24. This offset voltage is typically on the order of about −20 millivolts to 20 millivolts.

As discussed in the background, this technique of generating an offset voltage not only complicates the manufacturing process of making the sensor, but it can dramatically affect the performance of the sensor as well. Physically, to skew the configuration of transducer 11 requires changes to both the photolithographic mask used to pattern piezoresistors 12 and 14 and the mask used to pattern highly doped contact regions 15–18. In order to offer customers a variety of different offset voltages, each separate voltage would require a new set of expensive masks which presents logistical problems in keeping track of all the different configurations.

An even bigger problem with skewing the configuration of transducer 11, is the impact it has on the accuracy, TCO, and linearity of the sensor. The performance of a sensor is a significant function of how diaphragm 10 applies a force to transducer 11. By adjusting the physical layout of transducer 11, the amount and profile of the strain applied to each piezoresistor 12 and 14 is also changed. Each configuration of transducer 11 would require thorough characterization to understand the impact the configuration had on the performance of the sensor.

Turning now to FIG. 3, an improved method for forming a sensor having a natural offset voltage will be provided. FIG. 3 is an enlarged top view of a diaphragm 30 of a sensor 51 according to the present invention. Diaphragm 30 can be part of a sensor or part of a semiconductor device used in a variety of applications. Such sensors include, but are not limited to, a pressure sensor, an accelerometer, a gyro, and a chemical sensor. To measure the force or strain in diaphragm 30, a transducer 31 is used to generate an electrical response to the motion of diaphragm 30.

Preferably, transducer 31 is a configuration of piezoresistors 32 arranged as a Wheatstone bridge. It should also be appreciated that transducer 31 can be any structure capable of measuring the deflection in diaphragm 30 and can comprise piezocapacitors or be made from a piezoelectric material. Electrical contact is made to transducer 31 at contact points 33 to measure changes in voltage potential or current flow as diaphragm 30 moves.

The response of transducer 31 is communicated by highly doped contact regions 35, 36, 37, and 38 that are coupled to contact points 33. Unlike previously known configurations, at least one of the highly doped contact regions 35–38 is configured to adjust the resistance of this particular path. As shown in FIG. 3, highly doped contact region 37 is configured in a "c" pattern so that it has more squares of resistive material than highly doped contact regions 35, 36, or 38. Highly doped contact region 37 has a first region that makes contact to transducer 31 and a second region that provides the resistive path that generates an offset voltage. The term 'squares' is an industry term used by those who lay out the configuration of semiconductor devices. It provides a dimensionless and quantitative measurement of the relative surface area of a structure compared to other structures in the layout. Simply stated, if a structure has a width 'W,' then its length 'L' divided by 'W' is the number of squares of that material.

Highly doped contact regions 35, 36, 37, and 38 are electrically coupled to external systems by reference pads or output pads 41, 42, 43, and 44 respectively. As shown in FIG. 3, this coupling is provided by metal lines 40. Since highly doped contact region 37 has more squares of semiconductor material than highly doped contact regions 35, 36, and 38, it will provide a more resistive path and provide a lower voltage potential on output pad 42. Therefore, a voltage potential differential of about −20 millivolts to 20 millivolts will be present between output pads 42 and 44 which provides the offset voltage when diaphragm 30 is in relaxed condition.

An experiment was performed which compared the offset voltage generated by previously known sensor 50 of FIG. 1 to sensor 51 according to the present invention as shown in FIG. 3. In each case, there was no stress applied to the diaphragm. The previously known sensor generated an offset voltage of −6.7 millivolts and a sensor according to the present invention generated an offset voltage of +16.6 millivolts. The present invention, therefore, can be used to adjust an offset voltage compared to a standard transducer without having to adjust the configuration of the transducer used to monitor the diaphragm.

Figure 4:
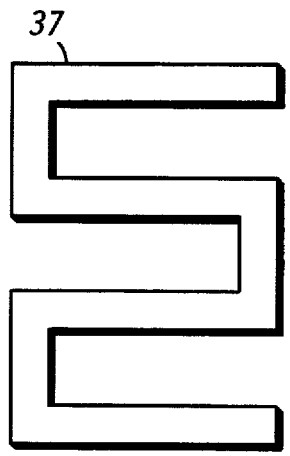
FIG. 4 is an enlarged top view of a portion of the sensor in FIG. 3 demonstrating an alternate configuration.

It should also be understood that highly doped contact region 37 can have a variety of configurations used to adjust the resistance value of this electrical leg. For example, FIG. 4 shows highly doped contact region 37 arranged in a serpentine pattern. Contact region 37 is configured so that its resistive value is not symmetrical to the electrical path of other reference voltage connections. Preferably, contact region 37 is configured to have 3 squares to 300 squares of semiconductor material which provides the resistance value necessary to generate the offset voltage.

A method for forming the highly doped contact regions 35–38 of the present invention will now be provided. After forming transducer 31 on diaphragm 30, highly doped contact regions 35–38 are formed by doping a portion of the sensor. Preferably, highly doped contact regions 35–38 are made by patterning diaphragm 30 or a silicon substrate using a photolithographic mask and then implanting the semiconductor material with either a p-type or n-type species. For example, the semiconductor material can be implanted with a boron source at a dose of 1E12 atoms/cm$^2$ to 1E15 atoms/cm$^2$ with an energy of 50 keV to 100 keV. This method can be used to form highly doped contact regions 35–38 with a sheet resistance of 1 ohm/sq to 1 kilo ohm/sq. Metal lines 40 and reference pads 41–44 can then be formed by patterning a conventional conductive layer as used in the industry. This will allow an external system to perform analysis of the response signals generated by transducer 31.

Adjusting the resistance value of highly doped contact region 37, by changing its configuration, does not affect the accuracy or linearity of the response generated by transducer 31. The present invention, therefore, provides a method for adjusting the offset voltage generated by a sensor, which does not involve skewing the configuration of the transducer that monitors the diaphragm. The present invention is a much more manufacturable method since different offset voltages can be generated without having to re-evaluate the impact each change has on the performance of the sensor. The present invention, therefore, allows the optimal configuration of the Wheatstone bridge to be used, since its configuration need not be adjusted to generate an offset voltage.

The present invention also provides a method that is a much more cost effective solution since only one photolithographic mask needs to be changed to adjust the number of squares in highly doped contact region 37. This allows a manufacturing facility to stage material at one point in the process flow and only vary one photolithographic step to produce sensors with various offset voltages. This improves the throughput in the manufacturing facility and reduces the cost of each sensor produced.

By now it should be appreciated that the present invention provides a sensor, and a method of operation, that has an offset voltage when a diaphragm is in a relaxed condition. This eliminates all the cost and performance issues associated with skewing the configuration of a transducer. The present invention provides a method for adjusting the offset voltage of the sensor that is cheaper and easier to implement in a manufacturing facility.

I claim:

1. A sensor having an offset voltage comprising:
   a diaphragm that flexes in response to a pressure differential across the diaphragm;
   a transducer comprising a plurality of legs that are in physical contact with each other, wherein the transducer is coupled to the diaphragm for detecting the pressure differential and generating an electrical response to the pressure differential;
   at least two reference pads electrically coupled to the transducer; and a resistive path between the transducer and one of the at least two reference pads so that the at least two reference pads provide an offset voltage, wherein the resistive path is adjacent to the transducer.

2. The sensor having an offset voltage of claim 1 wherein the offset voltage is about −20 millivolts to 20 millivolts.

3. The sensor having an offset voltage of claim 1 wherein the resistive path comprises a semiconductor material arranged to provide a resistive path between the transducer and one of the at least two reference pads.

4. The sensor having an offset voltage of claim 3 wherein the semiconductor material comprises 3 squares to 300 squares of semiconductor material.

5. The sensor having an offset voltage of claim 3 wherein the semiconductor material is doped to a sheet resistance of 1 ohm/sq to 1 kilo ohm/sq.

6. The sensor having an offset voltage of claim 3 wherein the semiconductor material comprises a plurality of squares arranged in a "c" pattern.

7. The sensor having an offset voltage of claim 3 wherein the semiconductor material comprises a plurality of squares arranged in a serpentine pattern.

8. The sensor having an offset voltage of claim 1 wherein the transducer is a Whetstone bridge.

9. The sensor having an offset voltage of claim 1 wherein the transducer comprises at least one piezoresistor.

10. The sensor having an offset voltage of claim 1 wherein the sensor is a sensor selected from the group consisting of a pressure sensor, an accelerometer, a gyro, and a chemical sensor.

11. A sensor comprising:
    a diaphragm having an edge;
    a transducer having four legs that are substantially equal in size, in physical contact with each other, and coupled to the diaphragm, wherein a portion of the transducer is overlying the edge of the diaphragm;
    at least two reference pads coupled to the transducer; and
    a resistive path having a plurality of squares between the transducer and one of the at least two reference pads, wherein a portion of the resistive path is coincident with the edge of the diaphragm and provides an offset voltage.

12. A semiconductor device comprising:
    a diaphragm that flexes;
    a Wheatstone bridge comprising a plurality of piezoresistors, wherein each of the plurality of piezoresistors is substantially equal in size, are in physical contact with adjacent piezoresistors of the plurality, and have a contact point that provides a voltage potential as the diaphragm flexes and an offset voltage when the diaphragm is relaxed; and
    a contact region coupled to at least one contact point, the contact region comprising a semiconductor material with a first region and a second region, the first region coupled to the Wheatstone bridge and the second region being coupled to the first region and having a plurality of squares.

13. The semiconductor device of claim 12 further comprising reference pads coupled to the Wheatstone bridge, wherein the second region of the contact region generates an offset voltage across the reference pads.

14. The semiconductor device of claim 13 wherein the offset voltage is about −20 millivolts to 20 millivolts.

15. The semiconductor device of claim 12 wherein the semiconductor material is doped to a sheet resistance of 1 ohm/sq to 1 kilo ohm/sq.

16. The semiconductor device of claim 12 wherein the plurality of squares are arranged in a "c" pattern.

17. The semiconductor device of claim 12 wherein the plurality of squares are arranged in a serpentine pattern.

18. The semiconductor device of claim 12 wherein the semiconductor material comprises silicon.

19. The semiconductor device of claim 12 wherein the semiconductor device is a sensor selected from the group consisting of a pressure sensor, an accelerometer, a gyro, and a chemical sensor.

20. A method for generating an offset voltage comprising the steps of:
    providing a transducer having a plurality of legs, wherein adjacent legs of the plurality are in physical contact with each other;
    applying a force to a diaphragm which flexes in response to the force;
    sensing motion of the diaphragm with the transducer; and
    conducting a response from the transducer with a semiconductor material having a plurality of squares that generates an offset voltage when the diaphragm is in a relaxed condition, the semiconductor material being coupled to the transducer.

21. The method for generating an offset voltage of claim 20 wherein the step of applying the force includes applying a differential pressure across the diaphragm.

22. The method for generating an offset voltage of claim 20 wherein the step of sensing motion of the diaphragm is performed with a Wheatstone bridge.

23. The method for generating an offset voltage of claim 20 wherein the step of sensing motion of the diaphragm is performed with at least one piezoresistor.

24. The method for generating an offset voltage of claim 20 wherein the step of conducting the response from the transducer includes passing the response to an output pad, the output pad having an offset voltage compared to a reference pad.

25. The method for generating an offset voltage of claim 20 wherein the step of applying a force to the diaphragm includes providing a diaphragm that is part of a sensor selected from the group consisting of a pressure sensor, an accelerometer, a gyro, and a chemical sensor.

* * * * *